United States Patent [19]

Streeter

[11] Patent Number: 4,593,218

[45] Date of Patent: Jun. 3, 1986

[54] DIRECTIONAL CONTROL OF PERMANENT MAGNET ROTORS

[76] Inventor: Edward C. Streeter, 89 Park Place, Park Parade, Harrogate, N. Yorkshire, England

[21] Appl. No.: 697,017

[22] Filed: Jan. 31, 1985

Related U.S. Application Data

[63] Continuation-in-part of Ser. No. 511,757, Jul. 7, 1983, abandoned.

[51] Int. Cl.⁴ .............................................. H02K 49/06
[52] U.S. Cl. ..................................... 310/103; 310/83; 310/114; 310/126
[58] Field of Search ................. 310/46, 103, 112, 114, 310/126, 105

[56] References Cited

U.S. PATENT DOCUMENTS

| | | | |
|---|---|---|---|
| 3,863,084 | 1/1975 | Hasebe | 310/114 X |
| 3,864,587 | 2/1975 | Landry | 310/103 |
| 4,037,400 | 7/1977 | Kitai et al. | 310/46 X |
| 4,100,441 | 7/1978 | Landry | 310/103 |
| 4,167,848 | 9/1979 | Kitai et al. | 310/103 X |

Primary Examiner—Donovan F. Duggan
Attorney, Agent, or Firm—Eisenman, Allsopp & Strack

[57] ABSTRACT

Apparatus which has a permanent magnet rotor magnetically coupled to a control field permanent magnet, the magnets being rotatable about respective rotational axes of support that are perpendicular to one another. The magnetic axis of each magnet is perpendicular to the rotational axis of that magnet, so that the rotor magnet changes in attitude about its rotational axis in response to a change in the magnitude and sense of the control field component perpendicular to the rotational axis of the rotor magnet. Such a change of the perpendicular control field component is caused by turning the control field magnet about its rotational axis through motor-driven reduction gearing including a worm and gear combination which holds the rotor magnet at its adjusted attitude after the motor is deenergized. The attitude adjusting effect of the control field magnet on the one rotor magnet is multiplied by arranging additional rotor magnets, similar to the one rotor magnet, so that all of the rotor magnets have their rotational axes in spaced parallel relationship with one another in a common plane parallel to the rotational axis of the control field magnet and have the same magnetic coupling relationship with the control field magnet.

9 Claims, 12 Drawing Figures

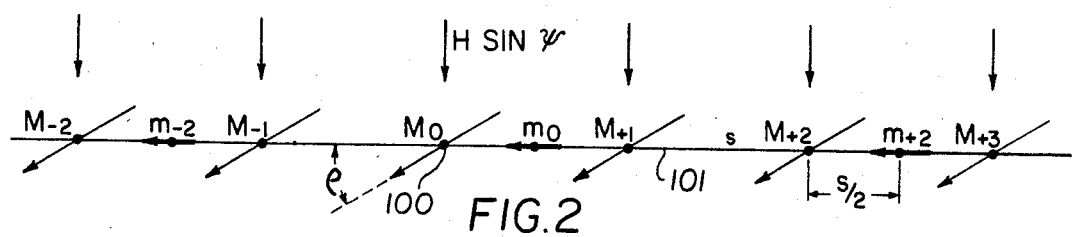
FIG. 2
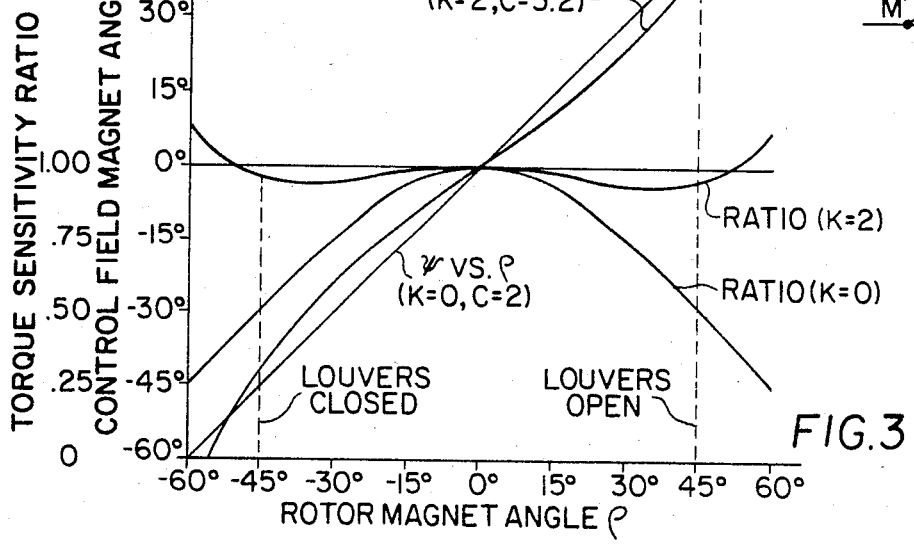
FIG. 1
FIG. 3
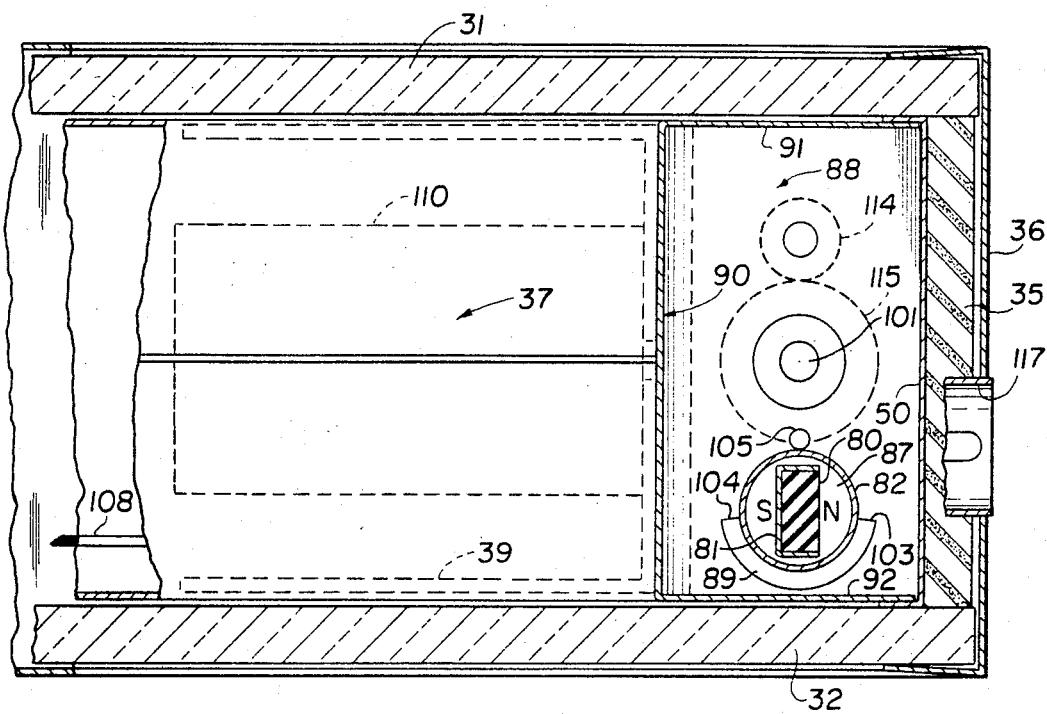
FIG. 6

DIRECTIONAL CONTROL OF PERMANENT MAGNET ROTORS

RELATED APPLICATIONS

This application is a continuation-in-part of application Ser. No. 06/511,757, filed July 7, 1983, now abandoned.

BACKGROUND OF THE INVENTION

1. Field of the Invention

This invention concerns directional control of permanent magnets, and it is particularly applicable to the simultaneous control of a plurality of rotors that are rotatable about transversely spaced coplanar axes. Such rotors are suitable for adjusting the attitudes of louvers of inaccessible Venetian blinds.

2. Description of the Prior Art

Environmental screens have been described in the patent literature having ribbon-like louvers supported only at their ends, each end being attached to a permanent magnet rotor. The angle of the rotors is determined by equilibrium between a control torque produced by a direct electromagnetic field and a restoring torque that tends to maintain each rotor at a predetermined angle of repose. Although only one long coil is required for each side of the screen, the two coils are relatively expensive to manufacture. Furthermore, a small amount of electrical power is continuously used to hold the rotors at other than the angle of repose.

SUMMARY OF THE INVENTION

The principal object of the invention is to hold a plurality of permanent magnet rotors at an adjustable angle by inexpensive non-contacting means without the consumption of energy.

Another object is to maintain the rotors firmly at the desired adjustable angle by maximizing rotor torque sensitivity and minimizing its variation with rotor angle.

Broadly speaking, the invention embraces apparatus for simultaneously adjusting the rotational angles of a series of permanent magnet rotors, each having a magnetic axis substantially perpendicular to its rotor axis and, by mutual magnetic coupling, contributing to a restoring torque on an adjacent rotor, comprising a rotatable control field permanent magnet common to all the rotors and having a magnetic axis substantially perpendicular to its axis of support and spaced from the rotors in magnetic flux linking relationship therewith, and means for adjusting the rotational angle of the control field magnet about its axis of support to apply control torques to the rotors that balance the restoring torques at desired rotational angles of the rotors.

Another aspect of the invention is embodied in apparatus for turning a plurality of permanent magnet rotors about transversely spaced parallel axes that lie in a common plane, the rotors having identical magnetic moments, parallel magnetic axes, and magnetically coupled to exert restoring torques that maintain the magnetic axes in repose in the common plane, and means for producing a magnetic control field perpendicular to said plane to turn the rotors from the angle of repose, characterized by the provision of a restoring torque magnet fixed midway between adjacent rotors with its magnetic axis in the common plane, its magnetic moment being small relative to the rotor moment to minimize variation of rotor torque sensitivity with rotor angle.

BRIEF DESCRIPTION OF THE DRAWINGS

FIG. 1 is a diagram illustrating the geometrical relationship of certain mathematical terms.

FIG. 2 is a diagram showing the substitution of magnetic dipoles for permanent magnets to explain the operation of the invention.

FIG. 3 contains a first pair of graphs showing the rotor angle $\rho$ as a function of the control magnet angle $\psi$ and rotor torque sensitivity ratio as a function of the rotor angle and a second pair of graphs showing the same variables as in the first pair of graphs modified by the presence of suitable fixed restoring torque permanent magnets to minimize variation in torque sensitivity.

FIG. 6 is a plan cross section of the portion of the screen of FIGS. 4 and 5 taken along the line 6—6.

BASIC THEORY OF OPERATION

Figure 4:
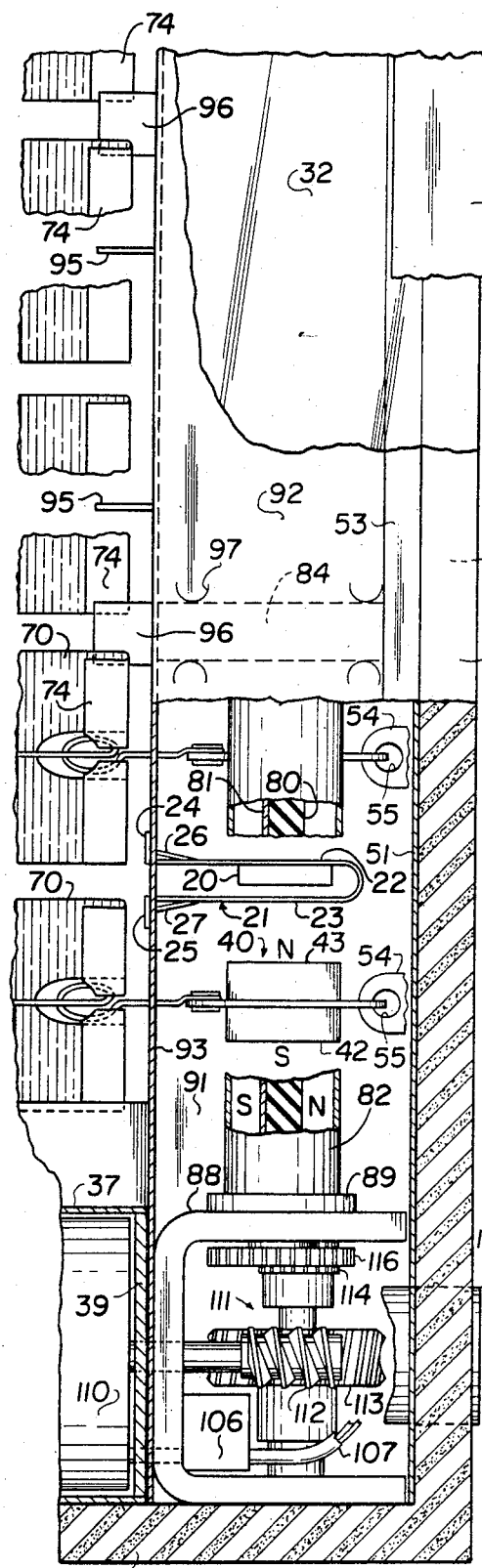
FIG. 4 is an elevational view of the lower right corner of an environmental screen incorporating the invention, seen from indoors with portions broken away to reveal internal construction.

A clear physical insight into the behavior of the permanent magnet rotors in the presence of a control field and each other can be obtained if ellipsoids having uniform magnetization are substituted for the actual magnets. This is not unrealistic because an ellipsoid may be given a prolate shape that is a good approximation of a practical magnet by suitable choice of major and minor axes. Each uniformly magnetized ellipsoid produces the same external effect as a dipole magnet of equal magnetic moment placed at its center and magnetized in the same direction.

Referring to FIG. 1, the torque Q on a dipole magnet of moment M at a distance d from a fixed dipole of moment M' is $$Q = MM'(\sin \mu \cos \lambda - 2 \cos \mu \sin \lambda)/d^3 \qquad (1)$$

where $\mu$ and $\lambda$ are the angles of the axes of dipoles M' and M, respectively, with the line through the dipole centers.

FIG. 2 shows dipoles substituted for the permanent magnet rotors. Identical rotor dipoles $M_{-2}$, $M_{-1}$, $M_o$, $M_{+1}$, $M_{+2}$, and $M_{+3}$ are uniformly spaced apart a distance s along a common centerline 101 with parallel magnetic axes forming equal angles $\rho$ with the centerline.

A mutual coupling torque $Q_{k+1}$ is exerted on the dipole $M_o$ by adjacent dipole $M_{+1}$ tending to decrease $\rho$. This torque is determined from equation (1) to be $$Q_{k+1} = -M^2(\sin \rho \cos \rho)/s^3 = -\tfrac{1}{2}M^2 \sin 2\rho/s^3 \qquad (2).$$

A torque $Q_{k-1}$ identical to torque $Q_{k+1}$ is exerted on dipole $M_o$ by dipole $M_{-1}$, and similar torques $Q_{k+2}$ and $Q_{k-2}$ are caused by dipoles $M_{+2}$ and $M_{-2}$, respectively. However, these last two torques are $\tfrac{1}{8}$ as large as $Q_{k+1}$ because here $d=2s$. The dipoles farther away from $M_o$ have even less effect, the total coupling torque $Q_k$ being $$Q_k = -1.2 M^2 \sin 2\rho/s^3 \qquad (3).$$

Reverting to FIG. 2, a restoring torque dipole magnet $m_o$ is fixed midway between rotor dipoles $M_o$ and $M_{+1}$ with its magnetic axis lying on the common centerline 101. Dipoles $m_{-2}$ and $m_{+2}$, identical to dipole $m_o$, are fixed midway between rotors $M_{-2}$ and $M_{-1}$ and between $M_{+2}$ and $M_{+3}$, respectively. Thus a fixed dipole of moment $m$ is spaced $s/2$ from every rotor dipole of moment $M$.

A restoring torque $Q_{ro}$ is exerted on rotor dipole $M_o$ by the adjacent fixed dipole $m_o$ tending to decrease $\rho$. Substituting $\mu=0$, $\lambda=\rho$ and $d=s/2$ into equation (1) gives a torque $$Q_{ro} = -16Mm \sin \rho/s^3 \qquad (4).$$

Adding the torques on the dipole $M_o$ caused by the fixed dipoles $m_{-2}$, $m_{+2}$, etc. at distances $3s/2$, $5s/2$, etc., respectively, we obtain a total restoring torque $$Q_r = -16.8 Mn \sin \rho/s^3 \qquad (5).$$

The control field permanent magnet subjects the dipole $M_o$ to a control field that varies approximately sinusoidally from zero when the magnetic axis of the control magnet is parallel to the axis of rotation 100 of the dipole $M_o$ to a maximum control field $H$ when the magnetic axis is perpendicular to the axis 100. A control torque is accordingly exerted on the dipole $M_o$ that can be expressed as $$Q_c = MH \sin \psi \cos \rho \qquad (6)$$

where $\psi$=angle of the magnetic axis of the control magnet relative to the common plane containing the rotational axes of the rotors.

The total torque $T$ acting on a typical rotor is the sum of the mutual coupling torque $Q_k$, the restoring torque $Q_r$, and the control torque $Q_c$ from equations (3), (5) and (6), respectively. In order to reveal the optimum value for the magnetic moment ratio $m/M$, this sum can be expressed as $$T = -[\sin 2\rho + K \sin \rho - C \sin \psi \cos \rho]B \qquad (7)$$

where
$K = 14.0 m/M$,
$C = Hs^3/1.2M$, and
$B = 1.2 M^2/s^3$.
At equilibrium $T=0$ and therefore $$\psi = \sin^{-1}[2 \sin \rho + K \tan \rho]/C \qquad (8).$$

When no fixed restoring magnets are employed $K=0$. If the maximum field strength $H$ of the control magnet is selected to make $C=2$, then $\sin \psi = \sin \rho$ and $\psi = \rho$.

However, it will be shown that $K=2$ is the optimum choice for this parameter. The strength of the control magnet must be sufficient when $\psi = +/-90°$ to hold the louvers firmly against the opening or closing limit stops. Furthermore, the parameter $C$ should give as linear a relationship between $\psi$ and $\rho$ as is practicable. Assuming that the rotors turn $+/-45$ degrees, a reasonable value is $C=5.2$, corresponding to $\rho=60°$, $\psi=90°$. FIG. 3 shows the rotor angle as a function of the control magnet angle for the conditions $K=0$, $C=2$ and $K=2$, $C=5.2$.

The ability of a rotor to reach and maintain a precise angle intermediate the limit stops is dependent upon the torque sensitivity of the rotor, that is the rate $dT/d\rho$ at which the total torque varies with the rotor angle. Differentiating equation (7) with respect to $\rho$ we have $$dT/d\rho = -[2 \cos 2\rho + K \cos \rho + C \sin \psi \sin \rho]B \qquad (9)$$

Thus the torque sensitivity at $\rho=0$ is, with the aid of fixed restoring magnets ($K=2$), twice that of the rotor without fixed magnets ($K=0$).

FIG. 3 shows graphs of the ratio of the rotor torque sensitivity at any given rotor angle to the sensitivity at $\rho=0$ under the conditions $K=0$ and $K=2$. It is observed that the torque sensitivity ratio when $K=0$ decreases rapidly as the rotor is turned from zero, but the torque sensitivity ratio when $K=2$ is almost independent of the rotor angle between the limits $\rho=+/-45°$. Accordingly, we find from the definition of $K$ that the magnetic moment ratio $m/M$ is preferably $1/7$. This ratio makes the initial slope of the restoring torque curve equal to that of the mutual coupling torque curve.

Reference should be made to a locking torque resulting from magnetization induced in the sides of the steel beam that contains the permanent magnet rotors. The locking torque may be viewed as arising from magnetic images of the rotors, and it has the same functional relationship to the rotor angle $\rho$ as the coupling torque $Q_k$ except that it is of much smaller amplitude and acts in the opposite rotational sense. Therefore the effect of the locking torque is merely to reduce slightly the apparent total coupling torque $Q_k$.

DETAILED DESCRIPTION OF A PREFERRED EMBODIMENT

Figure 5:
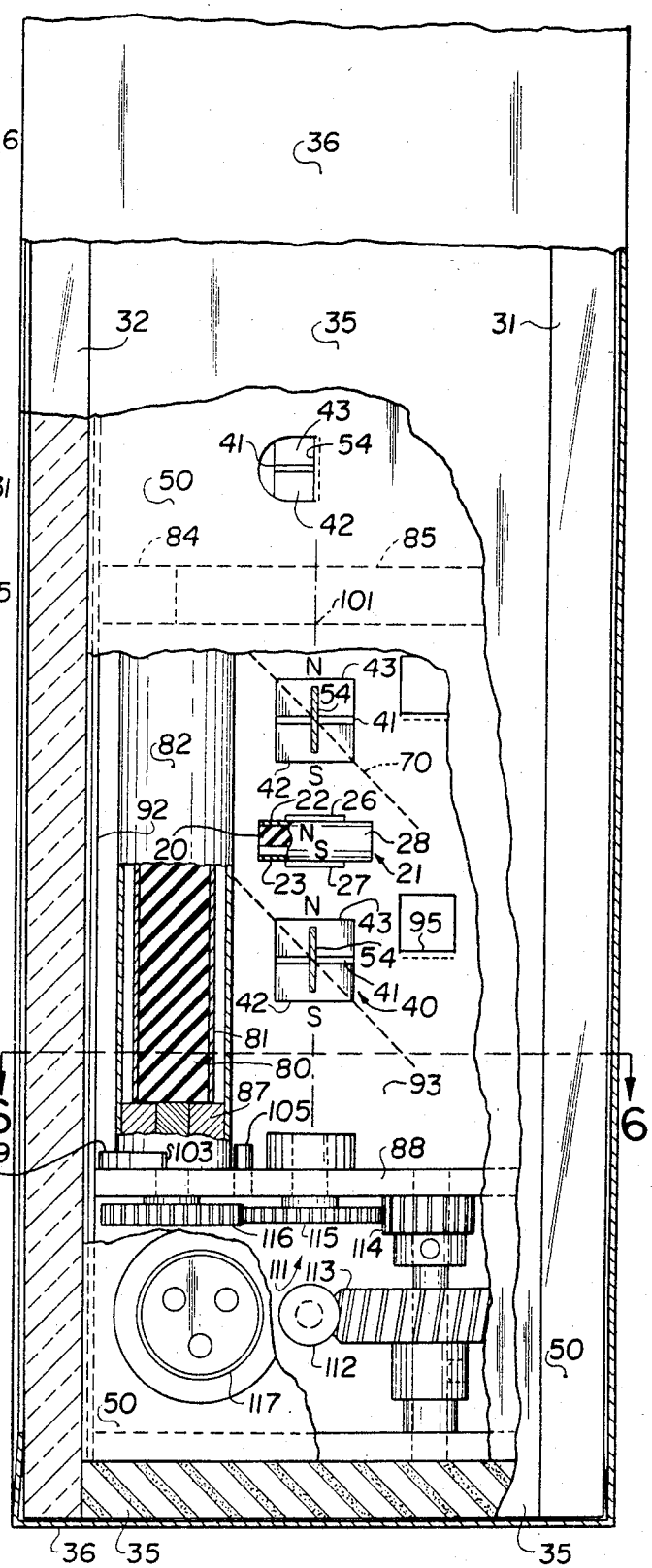
FIG. 5 is an end elevational view corresponding to FIG. 4 with portions broken away to reveal particularly the relationship of the control field magnet to the rotors.

The directional control is illustrated in FIGS. 4–6 incorporated in an environmental screen that comprises an array of reflective aluminum foil louvers 70 held under tension by their ends for rotation about parallel uniformly spaced horizontal axes 100 and enclosed in an air space between a pair of glass plates 31 and 32 of a dual-glazed window or skylight. Each end of every louver 70 is attached to a separate permanent magnet rotor 40 that is housed in a steel beam 90 on the right side of the screen (facing outdoors) and a similar beam (not shown) on the left side. A lower strut 37 and an upper strut (not shown) hold the two beams apart against the combined tensions on the louvers.

The angle of each rotor 40 is determined by a rotatable control field permanent magnet 80 common to all the rotors in beam 90 and having a magnetic axis substantially perpendicular to its axis of support and spaced from the rotors in magnetic flux linking relationship therewith. A similar control field permanent magnet (not shown) is common to all the rotors in the left beam.

The louvers 70 turn synchronously in response to simultaneous equal rotational adjustment of the control magnets except when in contact with opening limit stop 95 or closing limit stop 96.

The beam 90 is a channel of sheet steel having a rectangular U-shaped cross section comprising parallel flanges 91 and 92 adjacent the glass plates 31 and 32, respectively, and separated by a web 93 bounding the air space. A beam cover 50 extends between the free ends of the flanges 91 and 92 and closes the three-sided beam 90. An adhesive plastic sealant 35 is spread over the bottom of the lower strut 37, the outside of the beam cover 50, the upper strut (not shown), and the left beam cover (not shown) between the edges of the plates 31 and 32 to seal the dual-glazed unit hermetically. A protective channel 36 surrounds the perimeter of the plates to guard the edges of the glass.

The control field permanent magnet 80 is formed of a continuous long strip of rubber-bonded barium ferrite having a rectangular cross section that is uniformly magnetized through its thickness dimension. The magnet 80 is protected by a channel 81 of non-magnetic material and is inserted into a thin-walled cylindrical aluminum tube 82. The tube 82 extends the full length of the beam 90 past all the permanent magnet rotors 40. The rotational axis of the magnet 80 and the surrounding tube 82 is parallel to the line 101 (FIG. 7B) joining the centers of the rotors 40 and lies in the plane perpendicular to the rotor axes 100 that passes through the line 101.

The tube 82 is supported where needed by bearings. A typical bearing 83 is a rectangular partition of plastic material having a low frictional coefficient. The bearing extends transversely across the interior of the beam 90 and is fixed in position midway between adjacent rotor axes by dimples 97 projecting from the inside faces of the flanges 91 and 92. The bearing 83, seen most clearly in FIG. 7B, is split into two parts 84 and 85 to provide two halves of a cylindrical bushing loosely surrounding the tube 82. Dowels 86 maintain the parts 84 and 85 in alignment.

Means for turning the control field magnet 80 comprises an electrical step motor 110 connected through reduction gearing 111 to a cylindrical bushing 87 that is inserted in and supports the lower end of the tube 82. The reduction gearing 111 is mounted within a yoke 88 positioned in the beam 90 adjacent the end of the strut 37.

The bushing 87 has a collar 89 that lies against the yoke 88, extends almost halfway around the tube 82, and projects radially sufficiently beyond the tube to provide contact faces 103 and 104 at its circumferential ends, which are approximately diametrically opposite each other. The faces 103 and 104 cooperate with a stop pin 105 fixed in the yoke 88 to limit the rotation of the control magnet to $+/-90$ degrees.

The upper end (not shown) of the tube 82 is free to move axially to accomodate the difference in the thermal coefficients of expansion of the tube and the beam 90.

The step motor 110 is contained in the strut 37 where it is mounted on a bracket 39 that is fixed to the beam web 93. The bracket makes a sliding fit with the interior of the strut 37 and serves as a rigid corner connector to the beam 90. The tension on the louvers 70 maintains the beam firmly against the perpendicularly abutting strut 37.

The step motor 110 is of well-known construction with two pairs of stator windings that when energized produce magnetic fields perpendicular to each other and to the rotational axis of a permanent magnet rotor. The magnetic axis of the rotor is perpendicular to its axis of rotation and aligns with the direction of the resultant stator field. The stator windings are connected through a terminal board 106 and over three conductors 107 to a hermetically sealed recessed three-pin receptacle 117 adjacent the lower right corner of the dual-glazed unit. Sinusoidal and cosinusoidal control potentials are supplied to the stator windings from a source (not shown) external to the dual-glazed unit when it is desired to turn the rotor of the motor 110.

The reduction gearing 111 comprises a worm 112 on the shaft of the motor 110 that engages a worm gear 113 turning a pinion 114 connected by an idler gear 115 to a driven gear 116 fixed to the bushing 87 in the tube 82 that carries the control field magnet 80. The gearing 111 reduces each step of the motor to a very slight rotation of the control field. No electrical power is needed to hold the magent 80 stationary because its angle is effectively locked by the inability of the worm gear 113 to turn the worm 112.

A control field magnet (not shown) in the left beam corresponding to the magnet 80 is simultaneously and equally rotated by a step motor (not shown) connected in parallel with motor 110 by a three-wire conductor 108 to the terminal board 106. Angular synchronism between the opposite ends of the louvers is easily achieved by applying control potentials to the receptacle 117 until both step motors have turned their respective control field magnets to the angular limit and stalled.

Figure 7A:
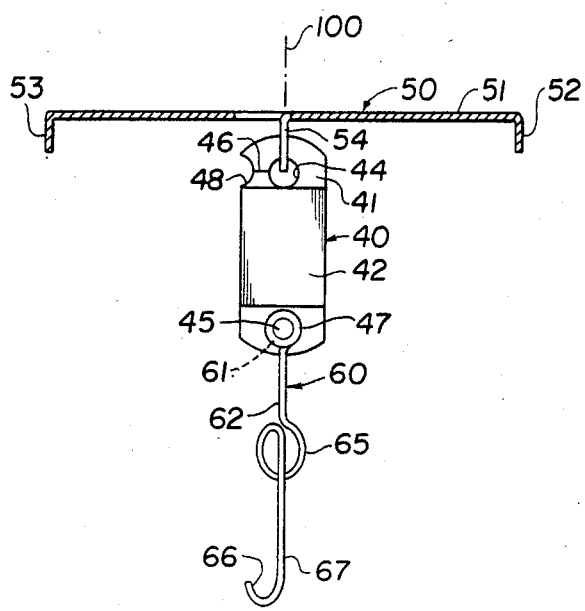
FIG. 7A is a view of a typical rotor linked by its plate-like armature to a beam cover, which is adapted to nest on the beam of FIG. 7B.
Figure 8A:
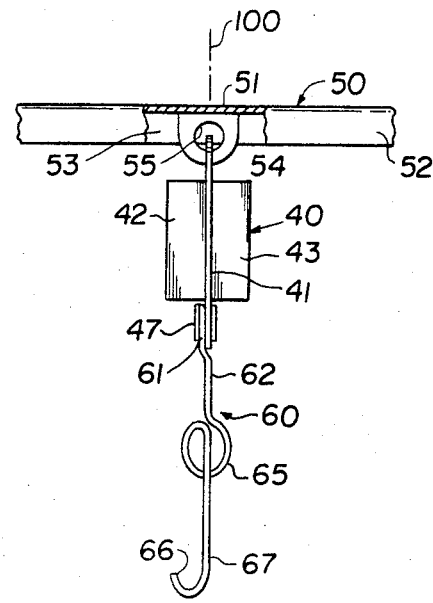
FIG. 8A is a side view of the rotor of FIG. 7A.
Figure 7B:
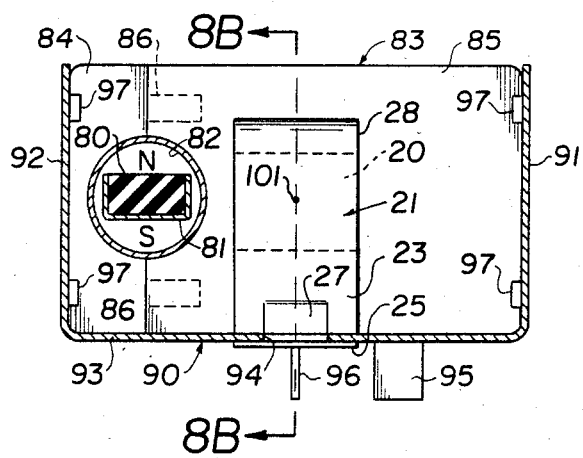
FIG. 7B is a cross-sectional view of a beam for housing the rotor of FIG. 7A in operative relationship to the control field magnet.

Looking at FIGS. 7A and 8A, each rotor 40 has a lamellar armature 41 on opposite faces of which a pair of permanent magnets 42 and 43 are fixed to produce magnetic flux perpendicular to the axis of rotation 100. The armature 41 is supported by the beam cover 50 for limited rotation about the axis 100, and it is provided with a coupling 60 for connection to the louver 70.

The rotor armature 41 is an approximately rectangular plate of thin, spring-temper metal having circular holes 44 and 45, one at each end of the plate centered on the axis 100. A closed slit 46 extends perpendicularly to this axis from the hole 44 to outside edge of the armature 41. The rotor magnets 42 and 43 are made of rubber-bonded barium ferrite flat strips having a high tack, pressure-sensitive adhesive layer on the surface in contact with the armature 41. The magnets 42 and 43 extend axially between the inner edges of the holes 44 and 45 and have a width coextensive with the armature. The thickness of each magnet is approximately one half its width; consequently the cross section of the rotor 40 perpendicular to the axis 100 is substantially square.

The beam cover 50 comprises a thin, spring-temper elongated metal strip 51 having parallel edges bent at right angles to the strip to form stiffening lips 52 and 53. A tab 54 containing a circular hole 55 projects perpendicularly from the strip toward the rotor armature 41. The tab 54 aligns with the longitudinal centerline of the strip 51 and is conveniently formed by slitting the strip in approximately a semicircular outline and bending the slit portion about the longitudinal centerline. The hole 44 in the armature 41 is linked to the hole 55 in the tab 54, access being obtained by momentarily springing open the slit 46. This operation is facilitated by a notch 48 at the outside edge of the slit 46.

The link connection between the rotor armature 41 and the beam cover 50 serves as a self-aligning sensitive rotational suspension offering low frictional torque. The metal thicknesses are greatly exaggerated in the drawings and are as thin as practicable. The cover 50 may be made of stainless steel and the armature 41 of beryllium copper, both tempered to very high tensile strength. The edges of the contacting surfaces are fully rounded by suitable shot peening to avoid any mechanical restoring torque over the required range of rotational angles.

The louver coupling 60 comprises a short length of wire of circular cross section having a closed circular eye 61 at one end, a louver fastening eye 65 intermediate its length, and a hook 66 at the other end. The eye 61 is held against a face of the rotor armature 41 by an eyelet 47 in the hole 45. A straight stem 62 extends from the eye 61 along the axis 100 to the louver fastening eye 65, which forms an almost full circle. The hook 66 is connected to the eye 65 by a shank 67 that passes across the diameter of the eye 65 in an approximately coaxial extension of the stem 62.

The desired angle, usually 45 degrees, between the magnetic axis of the rotor 40 and the plane of the louver 70 is provided by the angle between the plane of the eye 61 and the plane of the eye 65. The eyelet 47 is made with a shoulder (not shown) that abuts the armature 41 and leaves sufficient clearance for the eye 61 to permit alignment of the longitudinal axes of the armature and the stem 62.

Figure 8B:
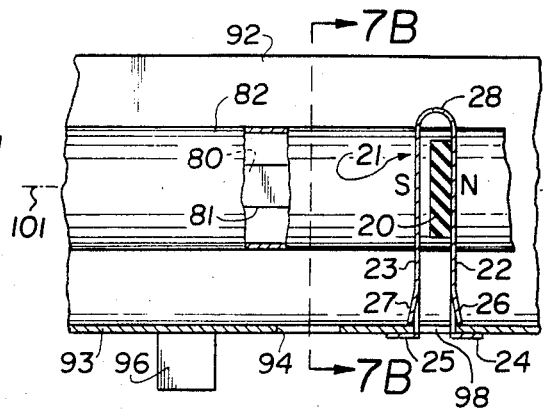
FIG. 8B is a side view of the beam of FIG. 7B with portions broken away to reveal the control field magnet.

Referring particularly to FIGS. 5, 7B and 8B, a circular hole 94 centered on the centerline of the beam perforates the web 93. The diameter of the hole 94 is sufficient to allow passage of the eye of the coupling 60. A louver opening limit stop 95 and a closing limit stop 96 are provided for the louver in the form of rectangular tabs slit and bent from the web 93. The stop 96 is located midway between adjacent holes 94. The stop 95 lies on a radius from the center of hole 94 perpendicular to the longitudinal centerline of the beam.

Figure 7C:
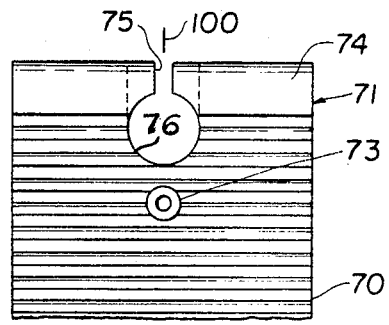
FIG. 7C is a plan view of an axially resilient louver provided with a terminal suitable for connecting to the rotor of FIG. 7A to which it attaches when the component parts of FIGS. 7A, 7B and 7C are assembled.
Figure 8C:
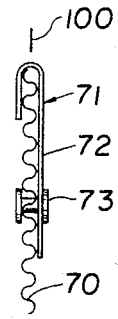
FIG. 8C is an edge view of the louver of FIG. 7C.

Referring now to FIGS. 7C and 8C, each louver 70 is made of a corrugated ribbon of spring-temper, high strength aluminum foil. The axes of the corrugations extend parallel to the width of the louver to stiffen the louver transversely and to render it longitudinally resilient. An analysis of this type of louver is contained in U.S. Pat. No. 3,342,244 granted Sept. 19, 1967. A thin layer of pure aluminum is preferably deposited on the alloy substrate of the louver to maximize its reflectance for sunshading and minimize its emissivity for insulation.

A louver terminal 71 protects the end of the louver and provides means for attaching the eye 65 of the coupling 60 to the louver. The terminal 71 has a rectangular flat plate portion 72, which is secured against a face of the louver by an eyelet 73 centered on the rotational axis, and a narrow transverse rim 74 formed by a U-bend, which extends from the plate portion 72 around the extreme transverse edge of the louver. The end of the louver nests within the rim 74 except adjacent the axis 100 where the rim and the louver are cut away by notches 75 and 76, respectively, sufficiently to accommodate the stem 62 and to permit the eye 65 to lie parallel to and against the plate portion 72.

Assembly of the beam cover 50, the beam 90 and the louver 70 is facilitated by a fixture (not shown) that holds the rotor 40 on the axis 100 until the hook 66 on the coupling 60 projects through the hole 94 and can be gripped. The fixture is then withdrawn, and the cover 50 is placed against the beam 90 with the lips 52 and 53 overlapping the flanges 91 and 92, respectively. The cover 50 is momentarily deflected toward the interior of the beam until the armature 41 contacts the inside of the web 93. This deflection provides adequate clearance between the eye 65 and the web 93 to permit the eye to be received in the notch 76 of the louver and slid into the pocket formed by the rim 74. Releasing the inward deflection of the cover 50 draws the terminal 71 of the now attached louver sufficiently close to the web 93.

It has been explained in the discussion of the theory of operation that improved rotor torque characteristics are obtainable by the provision of a fixed restoring torque magnet 20 of suitable strength centered on the centerline 101 between one rotor and an adjacent rotor in a perpendicularly bisecting plane. The magnet 20 is formed of rubber-bonded barium ferrite having a rectangular cross section that is uniformly magnetized through its thickness dimension. One face of the magnet 20 is attached by a pressure-sensitive adhesive layer to the inner surface of a leaf 22 of a non-magnetic spring clip 21 that is mounted in a rectangular hole 98 in the web 93 of the beam 90.

The spring clip 21 comprises two substantially parallel rectangular leaves 22 and 23 integrally joined by a resilient U-bend 28. The free ends of the leaves 22 and 23 are terminated in short flanges 24 and 25, respectively, that extend perpendicularly from the leaves in opposite directions. Detents 26 and 27 formed on the outer faces of leaves 22 and 23, respectively, provide sharp ridges closely adjacent the flanges 24 and 25, respectively.

The spring clip is mounted on the beam 90 by pushing the U-bend 28 through the hole 98 until the flanges 24 and 25 rest against the outer face of the web 93. In the process, the leaves 22 and 23 are deflected toward each other by contact between the transverse edges of the hole 98 and the detents 26 and 27 until the thickness of the web can be accomodated in the space between the detents and the flanges. Whereupon the clip 21 snaps into place and fixes the position of the restoring torque magnet 20.

I claim:

1. Apparatus for simultaneously adjusting the rotational angles of a series of permanent magnet rotors, each having a magnetic axis substantially perpendicular to its rotor axis and, by mutual magnetic coupling, contributing to a restoring torque on an adjacent rotor, comprising a rotatable control field permanent magnet common to all of the rotors and having a magnetic axis substantially perpendicular to its axis of support and spaced from said rotors in magnetic flux linking relationship therewith, and means for adjusting the rotational angle of said control field magnet about said axis of support to apply control torques to said rotors that balance said restoring torques at desired rotational angles of said rotors.

2. Apparatus according to claim 1 wherein the axis of support of the control magnet is parallel to a line joining the centers of the rotors and lies in a plane that passes through said line perpendicularly to said rotor axes.

3. Apparatus according to claim 1, wherein said control field permanent magnet is in the form of a strip having a rectangular cross section that is uniformly magnetized through its thickness dimension, said axis of support extending centrally within said strip.

4. Apparatus according to claim 1, wherein said means for adjusting the control magnet comprises a motor having a rotary output shaft mechanically coupled to said control field magnet by way of reduction gearing including a worm and gear combination.

5. Apparatus according to claim 1, wherein said permanent magnet rotor axes are in parallel spaced relationship with one another in a common plane which is parallel to said axis of support of said control field permanent magnet, and wherein said control field permanent magnet extends along its said axis of support in substantially the same magnetic flux linking relationship with each of said rotors.

6. Apparatus for simultaneously adjusting the rotational angle of a plurality of similar successively mutually magnetically coupled permanent magnet rotors about respective transversely spaced parallel axes thereof, each rotor having a magnetic axis substantially perpendicular to its rotational axis, comprising a control field permanent magnet having an axis of support substantially parallel to a line joining the centers of said rotors and magnetically coupled to said rotors to apply a control torque thereto that balances the restoring torque imparted by the mutual magnetic coupling between the rotors continuously over a range of rotational angles of the rotors and the control field magnet.

7. Apparatus according to claim 1 further comprising a restoring torque magnet having a magnetic moment small relative to the magnetic moments of said rotors and fixed midway between adjacent rotors with its magnetic axis in a plane containing the rotor axes.

8. Apparatus for turning a plurality of permanent magnet rotors rotatable about transversely spaced parallel axes that lie in a common plane, said rotors having identical magnetic moments, parallel magnetic axes, and magnetically coupled to exert torques that maintain said magnetic axes in repose in said common plane, and means for producing a magnetic control field perpendicular to said plane to turn said rotors from said angle of repose, characterized by the provision of a restoring torque magnet fixed midway between adjacent rotors with its magnetic axis in said common plane, its magnetic moment being small relative to said rotor moments to minimize the variation of rotor torque sensitivity with rotor angle.

9. Apparatus according to claim 8 wherein the moment of the fixed magnet is predetermined to produce a maximum restoring torque twice the maximum torque produced by the magnetic coupling between said rotors.

* * * * *